Oct. 30, 1951  N. D. GLYPTIS  2,573,005
IONIZATION GAUGE AND METHOD OF OPERATION
Filed July 3, 1948  4 Sheets-Sheet 1
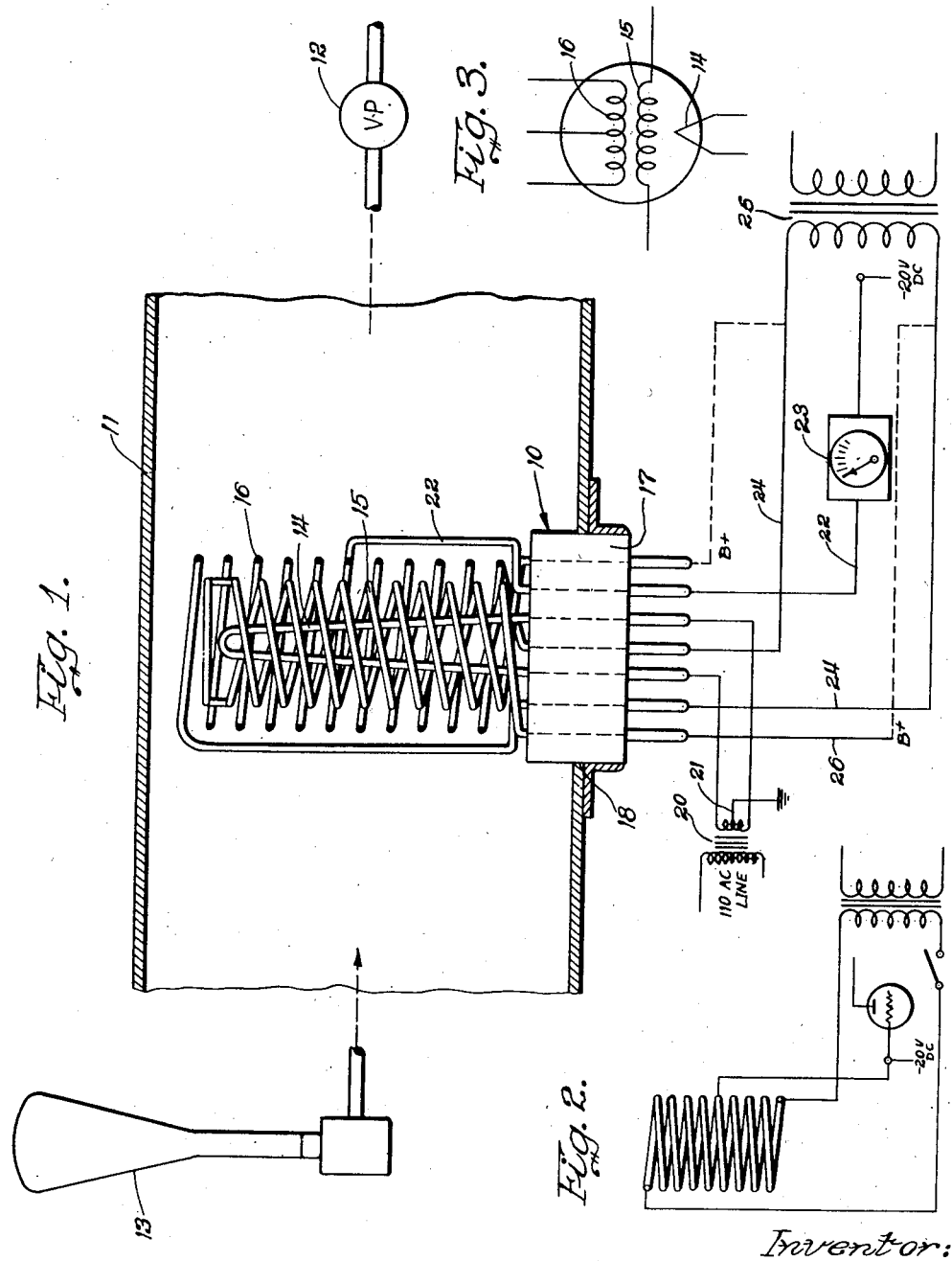
Inventor:
Nicholas D. Glyptis
By Graham D Harbaugh
atty Oct. 30, 1951  N. D. GLYPTIS  2,573,005
IONIZATION GAUGE AND METHOD OF OPERATION
Filed July 3, 1948  4 Sheets-Sheet 3
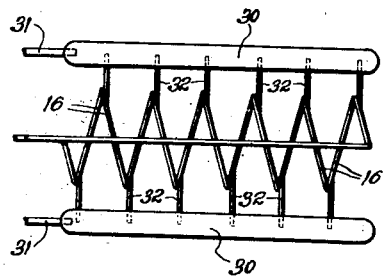
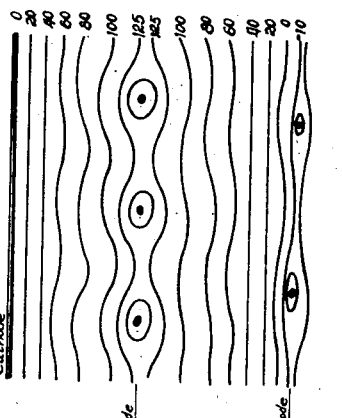
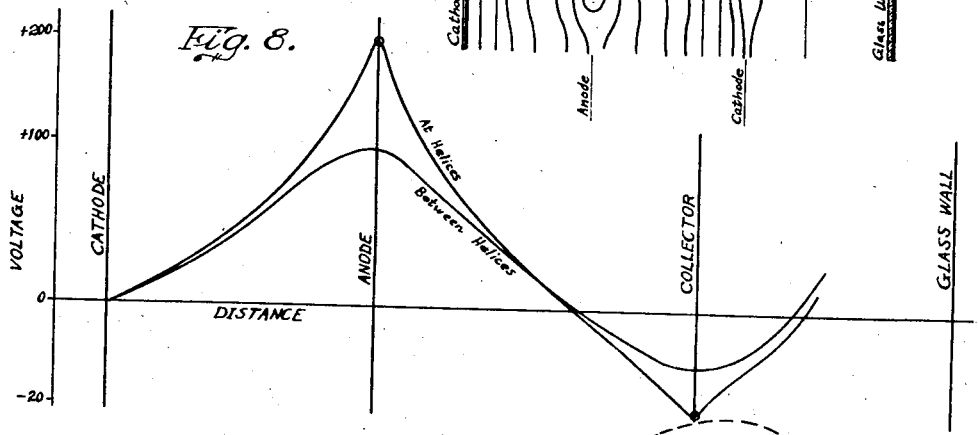
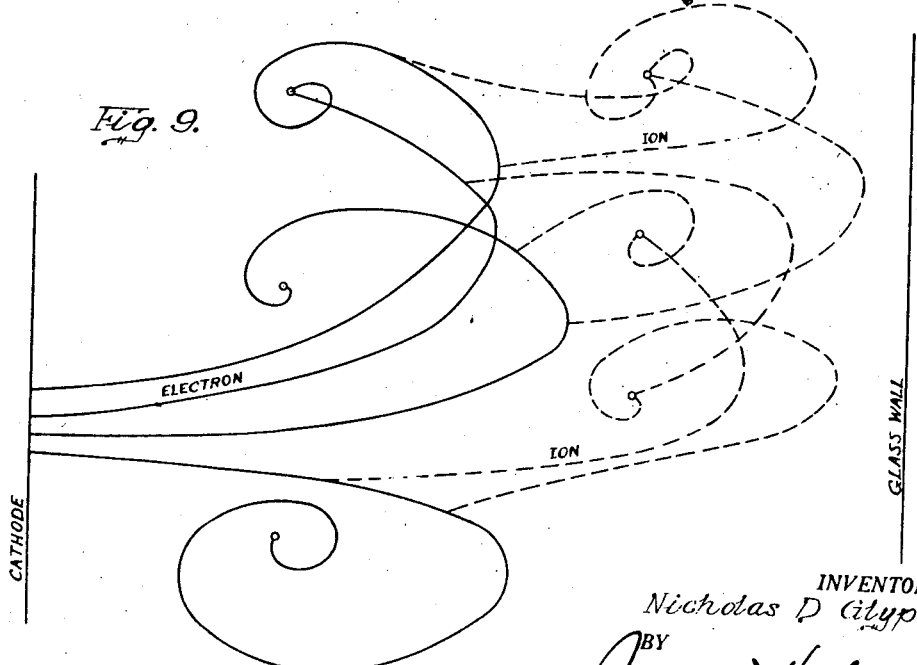
INVENTOR.
Nicholas D. Glyptis.

Oct. 30, 1951   N. D. GLYPTIS   2,573,005
IONIZATION GAUGE AND METHOD OF OPERATION
Filed July 3, 1948   4 Sheets-Sheet 4
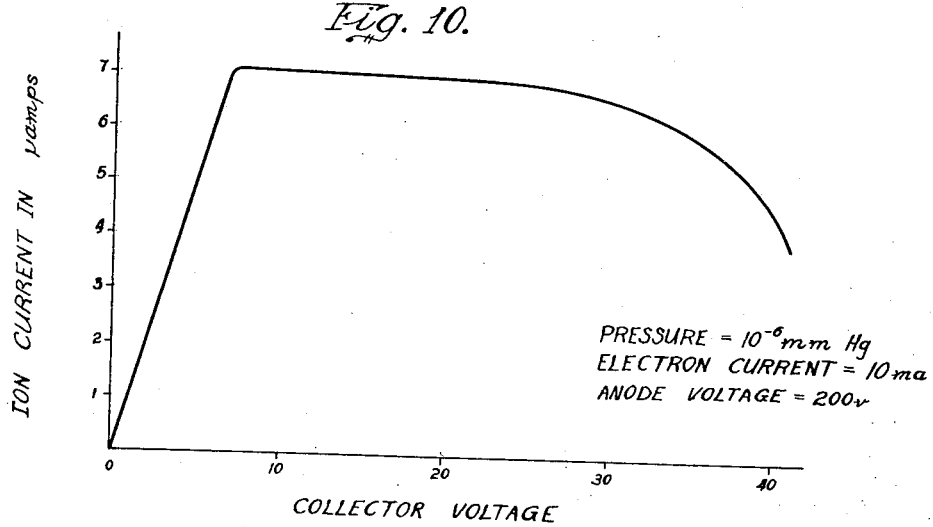
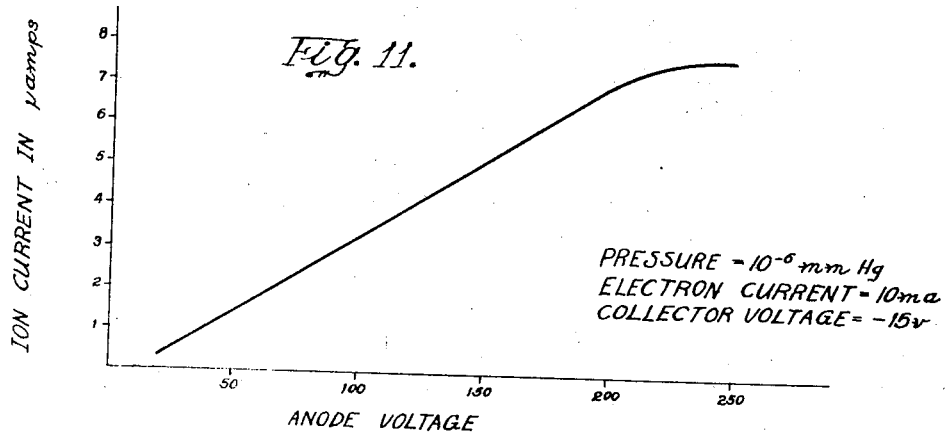
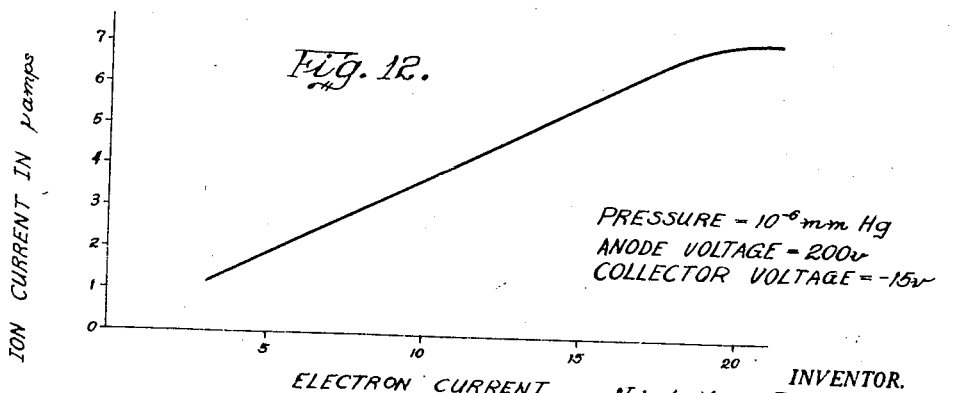

Patented Oct. 30, 1951

2,573,005

UNITED STATES PATENT OFFICE 2,573,005

IONIZATION GAUGE AND METHOD OF OPERATION

Nicholas D. Glyptis, Chicago, Ill.

Application July 3, 1948, Serial No. 36,967

8 Claims. (Cl. 175—183)

1

This invention relates generally to pressure gauges and more particularly to an improved gauge for high vacuum work which operates on the ionization principle.

In the manufacture of high vacuum tubes such as cathode ray, X-ray, electron microscope, mass spectrometer, and similar equipment, it is often extremely important that the pressure or degree of vacuum present within the tube be accurately ascertained. The usual procedure in evacuating such equipment is to first connect the equipment to a conventional mechanical vacuum pump and remove as much of the gas as possible. When the limit of the pump is reached, a high vacuum producing device such as a mercury diffusion pump is employed to increase the vacuum to the desired range.

The gauge of this invention is intended for use in conjunction with the diffusion pump during the final stages of evacuation for measuring pressures of from $10^{-3}$ to $10^{-9}$ mm. of Hg and can be extended to cover the range of 1.0 to $10^{-3}$ mm. of Hg. Heretofore, ionization gauges such as the platinum collector gauge have been used, but these gauges have not proved to be entirely satisfactory in that they are not sufficiently reliable and the readings obtained may be erroneous in a magnitude which would make a very substantial difference in the performance of the equipment being evacuated. The ionization gauges commonly employed comprise an axial cathode surrounded by an anode mesh or grid and a negatively charged collector in the form of a cylindrical plate which surrounds the anode. When the anode is charged to a high positive potential and the collector is charged negatively with respect to the cathode, the gauge being inserted in communication with the space being evacuated, gas atoms within the space are ionized and migrate to the collector forming an ion current. The anode being positively charged attracts electrons emitted by the cathode so an electron current results. The ratio of these two currents is then measured in any one of the number of ways to determine the pressure within the tube, for this ratio is a function of the pressure.

The main reason that such devices are erratic is that the collector tends to become gasified and affects the magnitude of the ion current with the result that it is not dependent on the pressure within the space. This gasification occurs because positively charged gas ions flow to the collector and give up their charges, no force being present which tends to drive them off.

One object of this invention is therefore to provide an ionization gauge for measuring high vacuums having a collector which will not become gasified.

Another object is to provide a collector in the form of a conducting element which may be heated electrically either during the time the tube is in operation or prior thereto or both to outgas same.

A further object is to provide a tube having a

2 collector electrode which is in the form of a coil of tungsten wire having its ends connected to a source of current which serves to heat it to cause degasification thereof.

A further object is to provide such a spiral collector having a center tap from which the ion current is drawn off.

A further object is to provide a method for measuring the pressure within a space which includes the steps of generating an electron discharge in the space, attracting the electrons to an anode, causing some of the electrons to pass beyond the electrode to produce ionization of the gas within the space, attracting the ions to a collector, heating the collector during the time measurements are taken for the purpose of outgassing, and measuring the current flowing from the collector.

A further object is to provide an ionization gauge in which the collector electrode may be operated either hot or cold, it being supported in a novel manner, linear results being obtained in either case.

A further object is to provide a gauge having a novel electrode arrangement, spacing and charge relationship whereby a linear output is achieved over the entire working range.

A further object is to provide a gauge which may also be employed as a Pirani type gauge for measuring higher pressures by merely connecting the collector electrode into one leg of a sensitive Wheatstone bridge circuit thereby avoiding the evacuation of an additional gauge which is normally connected to the apparatus.

Other additional objects of this invention will of course present themselves to those familiar with the art upon reading the following specification in conjunction with the drawings and the appended claims.

In the drawings:

Fig. 1 is a schematic view showing the manner in which the ionization gauge of this invention is employed to measure the vacuum attained when a piece of apparatus is being evacuated;

Fig. 2 is a schematic view showing the manner in which the collector electrode is energized and its output applied to an amplifier;

Fig. 3 is a schematic view showing the equivalent circuit of the gauge;

Fig. 6 is a view showing the manner in which the collector electrode is supported;

Fig. 7 is a diagram showing the electro-static field distribution within the gauge, zones of constant potential being indicated by lines;

Fig. 8 is a graph showing the field distribution potential being plotted against distance;

Fig. 9 is a diagrammatic view showing typical electron and ion trajectories occurring in a gauge constructed according to my invention;

Fig. 10 is a graph of the ion current vs. the collector voltage for the gauge of this invention, the values being obtained by varying the collector voltage and measuring the ion current;

Fig. 11 is a graph of the ion current vs. the anode voltage, the values being obtained by varying the anode voltage and measuring the ion current; and Fig. 12 is a graph of the electron current vs. the ion current, the values being obtained by varying the electron current and measuring the ion current.

Figure 4:
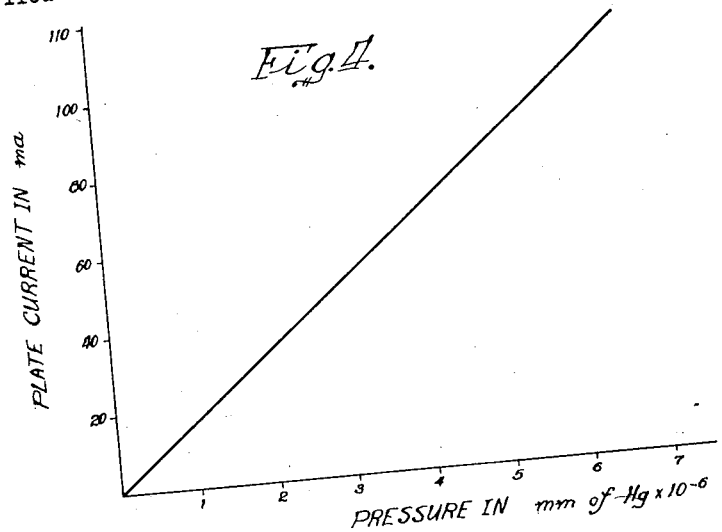
Fig. 4 is a graph showing the change in amplifier plate current as the pressure is varied.

One manner in which the gauge 10 may be installed in a conduit 11 connected to a vacuum pump device 12 and a tube 13 which is being evacuated by the pump 12 is shown in Fig. 1. The vacuum pump 12 is merely shown diagrammatically, but in most cases would be a mercury vapor or oil diffusion pump connected in series with a mechanical pump. The tube 13 is illustrated as a cathode ray tube, but this is merely representative, for the gauge of this invention may be employed regardless of what type of equipment is being evacuated.

In the preferred embodiment the gauge 10 comprises a hair-pin shaped axial filament or cathode 14 surrounded by a helical accelerating anode or grid 15 which is in turn surrounded by a helical collector electrode 16 (sometimes hereinafter called collector), all of the electrodes being supported on a base 17 and extending into the conduit 11.

In Fig. 1 the gauge 10 is illustrated as being mounted in an opening 18 in the wall of the conduit 11. Actually, however, the gauge 10 is usually mounted within a T-shaped piece of glass tubing which is connected either by fusing or by cementing to the pump 12 and the apparatus 13 being evacuated. In some cases it has proved desirable to mount the electrodes in opposite arms of the T, the lead-in wires of the collector electrode 16 entering through one of the arms of the T and the lead-in wires of the filament 14 and the accelerating anode 15 entering from the opposite branch of the T. The third branch of the T is connected to the space being evacuated. Whichever arrangement is used the relative spacing between the various electrodes is maintained substantially the same as illustrated in Fig. 1.

The filament or cathode 14 is connected to a filament transformer 20 which supplies the current for heating it to operating temperature. A center tap 21 on the filament transformer 20 is connected to ground, the result being to ground the filament 14.

The accelerating anode 15 is wound in the form of a double helix. This is done in order that both lead-in wires will extend from the same side of the gauge, no long return wire being required from the opposite end of the helix. The collector electrode 16 is in the form of a simple helix having a center tap 22.

In order to prevent sagging when heated, coil turns of the collector electrode are supported in a novel manner as shown in Fig. 6. A pair of glass pillars 30 slightly longer than the length of the helix are supported on wires 31 spot welded to the press wires or fused into the tube base 17, the wires 31 being eliminated. A plurality of tungsten or nickel wire pins 32 are imbedded in the pillars 30 and spot welded to the turns of the helical collector 16. Thus each coil turn is supported at two points and is rigidly mounted.

The electrical equivalent of the gauge 10 is illustrated in Fig. 3, like parts bearing like numbers.

The ends of the collector electrode are connected by the conductors 24 to a transformer 25 which supplies an alternating current to the collector 16 as a heating current to heat the collector 16 to a cherry-red heat in order to degasify it. The center tap 22 is connected through a galvanometer or D. C. current amplifier 23 to a source of —20 v. D. C. potential. The lead 26 of the anode 15 is connected to a source of positive 200 volt potential.

Thus the gauge 10 is a triode having a heated filament serving as a cathode, an accelerating anode charged to a high positive potential and a collector charged to a potential slightly negative with respect to the cathode. The gauge 10 is operated substantially as follows:

When the various electrodes are energized, electrons are emitted by the hot cathode 14 and travel towards the anode 15 most of them passing between the individual coil turns of the anode 15 into the space between the anode 15 and the collector 16. Some of these electrons strike gas molecules causing them to become ionized as positive ions. All electrons which do not strike these molecules follow curved paths and return to the anode 15, as do electrons released at each ionizing collision. The positive ions which are formed in the space between the anode 15 and the collector 16 are repelled by the electrostatic field of the anode 15 and move outwardly passing through the coil turns of the collector 16 to the space beyond and then returning to the collector. The ion trajectory is similar in shape to that followed by the electrons. The ions on striking the collector 16 give up their charges to in turn form an ion current which flows through the lead 22 to the galvanometer 23 and the source of negative potential. Since the number of ionizing collisions which occurs is a function of the number of molecules present between the collector 16 and the anode 15 which number in turn depends upon the pressure of the gas, the ion current as measured by the galvanometer 23 is a function of the pressure present, the lower the pressure the smaller the current produced.

Figure 5:
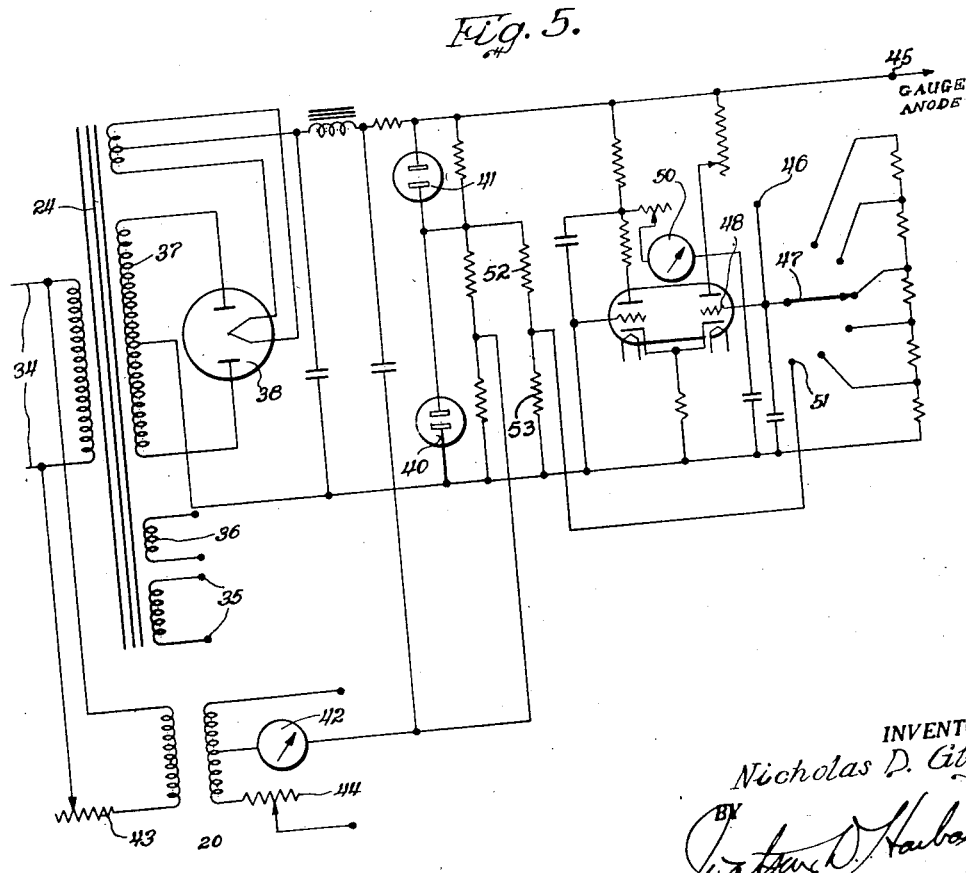
Fig. 5 is a wiring diagram of the preferred amplifier and power supply circuit.

In Fig. 5 the preferred amplifier and power supply circuit is shown. Power is supplied from the line conductors 34 to the gauge filament transformer 20 and to a second transformer 24. The heating current for the collector 16 is drawn from the leads 35 of the transformer 24. Another filament winding 36 supplies the heating current to the amplifier tubes and a third winding 37 supplies a high voltage to a full wave rectifier tube 38. The output of the rectifier is filtered by a conventional choke and capacitor network to provide high voltage D. C. The value of this D. C. plate voltage is maintained satisfactorily constant by a pair of gas filled voltage regulator tubes 40 and 41 which also serve to supply a constant potential calibration voltage.

A milliammeter 42 provided in the gauge filament circuit is employed as indicator to aid in maintaining the electron current constant at 10 milliamperes. Two potentiometers 43 and 44 are provided to adjust this current.

The grid or accelerating anode 15 is connected to the plate voltage supply at the point 45 indicated on the diagram. The center tap 22 of the collector 16 is connected at the point 46.

Thus the ion current as modified by the step switch sensitivity control 47 is applied on one of the grids of double triode tube 48. The output of this tube drives a microammeter 50 which is preferably calibrated so as to read directly in pressure units.

In order to facilitate calibrating the circuit, a tap 51 on the sensitivity control switch 47 is connected between two resistors 52 and 53 connected across the voltage regulator 49. Thus a constant calibration voltage is made available.

Assuming that a gauge has the desired range there are two additional characteristics which are essential to satisfactory performance. The first is that the gauge be consistently accurate and reliable, and the second that the output be a linear function of the quantity being measured.

The accuracy requirement is met in my device by employing a collector in the form of a coil which is heated by an electric current thereby preventing gasification as described above.

The linearity requirement is met by the design of the electrodes, their spacing, and the potentials applied thereto. I have discovered that the following factors affect the linearity of the output:

1. The electrode spacing and voltages must be such that mean-free-path or integrated path of ions is less than 10 cm. in length at the high pressure limit of the gauge ($10^{-3}$ mm. of Hg);

2. The electron trajectories must be such that substantially all of the electrons pass beyond the accelerator electrode and then return and that the electrons do not strike the collector;

3. The ion trajectories must be such that ions pass beyond the collector, but do not strike the glass envelope; and 4. The electrode spacing and voltages must be such that Barkhausen-Kurtz oscillations for both the electrons and ions have a frequency far above 1000 cycles per second.

To achieve these conditions I prefer to construct the gauge and operate it substantially as follows:

The filament 14 is formed of a single hair-pin shaped loop of tungsten wire .010 inch in diameter and two inches long. Thus the length of the loop is one inch. In some cases it has proved desirable to employ a pair of filaments, the second one being a spare in case the first is burned out.

The accelerating anode 15 is formed of .010 inch diameter tungsten wire wound in a helix .375 inch in diameter four turns in and four turns out. The helix is one inch long so actually there are eight turns to the inch, and each turn is spaced ⅛ of an inch from the adjacent turns.

The collector electrode is also formed of .010 inch or .001 diameter tungsten wire wound into a helix having a diameter of 1.125 inches and a length of 1¼ inches and 10 turns to the inch or 12½ turns in all.

From the graph of ion current versus anode or accelerating voltage (Fig. 11), it is seen that the ion current varies linearly with accelerating voltage between 45 volts to 230 volts. From the graph of ion current versus electron current (Fig. 12), it is seen that the slope is constant up to an electron current of 18 ma.

Thus by writing the equations for the slope of the curves of Figs. 11 and 12, $$\frac{dI_i}{dE_a} = h_1$$

and $$\frac{dI_i}{dI_e} = h_2$$

where $I_i$=ion current, $E_a$=anode voltage, and $I_e$=electron current, and by dividing one by the other, the following equation is obtained:

$$\frac{dI_e}{dE_a} = \frac{h_1}{h_2}$$

These equations are accurate as long as values for the anode voltage and electron current within proper ranges as determined by the graphs are employed.

45 v. $\angle E_a \angle$ 230 v.
0 $\angle I_e \angle$ 18 ma. (collector cold)
2.5 ma. $\angle I_e \angle$ 18 ma. (collector heated)

The ratio of the electron current to the ion current is called the vacuum ratio, and the sensitivity equals the change in the vacuum ratio per micron of pressure.

In other words, that at a given pressure, the vacuum ratio of electron current to ion current is constant when the variables are within the ranges set forth above. With the objective from the circuit design viewpoint of obtaining the greatest ion current at a given pressure, the accelerating voltage is chosen to be as close to the upper limit (230 v.) as the voltage regulation permits, while the electron current is as high as possible with consideration to the life of the filament at the lower operating pressure. Then sensitivity given as microamperes ion current per micron pressure is constant, and has its highest value, at a given calibrated electron current, when the accelerating anode voltage is close to 230 v.

The collector 16 is, in the preferred embodiment, charged to a potential of −15 volts. A graph of the ion current vs. the collector voltage (Fig. 10) reveals that no appreciable change in ion current occurs as the collector voltage is varied from −10 to −20. Hence, −15 is chosen for the collector voltage.

If this potential is higher than minus 10 volts, a portion of the positive ions fail to reach the collector while some of the faster electrons do reach the collector thus causing the curve to change rapidly, in a decreasing manner, while below minus 20 volts, the electron paths in the space between the accelerating anode and collector electrode are decreased resulting in less ionization and a slowly decreasing ion current as shown in the graph.

The electron current should be held at a given value during pressure measurements in order that the calibration of the ionization gauge amplifier micro-ammeter in mm. of Hg be held true. Whether the collector electrode is operating hot or not it is preferable to employ an electron current of 10 ma. When reading lower pressure values in the last range, it is preferable to operate with an electron current of 5 ma. in order to protect the life of the filament. In this case, one must multiply the pressure indication as indicated by the ionization gauge amplifier microammeter by a factor of 2, since the calibration holds true only as long as the electron current is 10 milliamperes.

It has been found experimentally that when the collector electrode is operating hot and the electron current is below 2.5 milliamperes an erratic instability occurs on the ionization amplifier microammeter. Therefore, when the gauge is operating with collector heated, the reading of pressures with an electron current below 5 ma. should be avoided in order to eliminate this instability. With the collector either hot or cold it is noted from the graph of ion current versus electron current that the linearity persists up to 18 ma.

In Figs. 7 and 8 the electro-static field configurations for the gauge of my invention are shown. These graphs were constructed by employing the La Place equations and relaxation network mathematics.

The method of conformal transformation might have been used, but it is not believed to be sufficiently accurate when applied to the electrode shapes employed.

Once the electron field configuration and the potential distribution is known the electron and ion trajectories as shown in Fig. 9 may be determined as well as the lengths of the integrated electron and ion paths.

To accurately determine the magnitude and the distribution of the mean-free-paths as applied to molecules, ions and electrons, it is necessary to employ statistical wave mechanics and erf-functions. These calculations for the preferred embodiment of my gauge have been made and the results are tabulated below.

| Mean-Free-Path— | Pressure | | |
| --- | --- | --- | --- |
| | $10^{-1}$ mm. Hg | $10^{-3}$ mm. Hg | $10^{-7}$ mm. Hg |
| | Cm. | Cm. | Cm. |
| of Electrons | 36 | 3600 | 360,000 |
| of Ions | 9 | 900 | 90,000 |
| of Molecules | 6.3 | 630 | 63,000 |

The molecular mean-free-path which is the shortest is least important because the energy levels are low and slight excitations may occur at the most as a result of collisions. The ion mean-free-path is most important, for it determines the number of ionizing collisions which will occur between ions and unionized atoms. It has been found by experiment as well as calculation that as long as the mean-free-path is kept below 10 cm. at one micron pressure, no appreciable ionization of atoms on collision with ions occurs. The ionization gauge, therefore, is designed to integrate ionic trajectories which are below this value. Considering the fact that a small percentage of the ion to molecule collisions are ionizing due to the slow velocities of the ions it is extremely unlikely that nonlinearity in the ionization gauge will result because of ionizing collisions between ions and any gas molecules of the air.

The electron mean-free-path has a magnitude much longer than the integrated electron trajectory path which means that the possibility of multiple ionizing collisions is nil and the collisions which do produce the ion current are in the far lower end of the mean-free-path distribution function.

The Barkhausen-Kurtz oscillation frequencies for the preferred embodiment have been calculated and have been found to be $2.3 \times 10^8$ cycles/sec. for the electrons and $10^7$ cycles/sec. for the ions. The electron frequency was calculated by calculating the electron velocity during its travel from the cathode to the anode according to the equation:

$$\text{Velocity} = \frac{dx}{dt} = 5.93 \times 10^7 E^{\frac{1}{2}}$$

The equation was integrated and solved for "$t$" assuming that the voltage at any point between the grid and cathode varied directly with the distance. The reciprocal of the value obtained for "$t$" was the frequency.

To determine the lowest ion oscillation frequency it was assumed that the ionizing collisions were perfectly elastic and that, therefore, the ion velocity and the colliding electron velocity varied as the square roots of their masses. The electron velocity between the anode and the collector was calculated similarly to that between the cathode and anode.

Since the ion velocities are always lower than those of the electrons the frequency of oscillation is consequently lower, the ion oscillation frequency is the critical value. Tests performed on various gauges indicate that a gauge will give stable, reliable results when coupled to an amplifier if the ion oscillation is above 1000 cycles/sec. or if it is not in resonance with the coupling impedance.

Another factor which must be considered from the standpoint of linearity is the effect of the alternating magnetic field induced by current flowing in the collector electrode upon the electron and ion trajectories. In the preferred embodiment a maximum current of 3 amperes flows, the coil having 10 turns and a radius of approximately 10 cm. Thus, the field strength, according to the equation:

$$H = .899 \frac{ni}{r} = .899 \frac{10 \times 3}{2}$$

is approximately 14 gauss.

The effect of the alternating magnetic field is to tend to cause the electrons and ions to travel in a circle. The radius of this path is calculated by the equation:

$$\frac{MeV^2}{r} = BeV$$

where $Me$ is the mass of the electron in grams,
$V$ is its velocity in cm./sec.,
$r$ is the radius of the spiral in cm.,
$B$ is the flux density in gauss, and
$e$ is e. s. u. of charge.

In the preferred embodiment the radius of the circle is approximately 3.5 cm. Hence, the electrons travel in spiral paths from the cathode to the anode but the deviation in this path from the path they would follow were the magnetic field not present is negligible. Due to their far greater mass, the ion trajectories are even less affected and need not be considered.

Another advantage of the gauge of this invention is the fact that it may be readily used to determine the pressure present at relatively low vacuums from atmospheric pressure down to $10^{-3}$ mm. of Hg. This is accomplished by using the collector 16 as one leg of a Wheatstone bridge, the opposite leg being a similar coil under atmospheric pressure. Each coil is then heated by passing a current therethrough and the resistances are compared by the bridge in the same manner as in the conventional Pirani gauge.

When evacuating a space the preferred procedure is to first use the gauge as a Pirani until a pressure of $10^{-3}$ mm. is reached and then to use it as an ionization gauge during the final stages of the evacuation.

When desired, an A. C. instead of a D. C. amplifier may be used with the gauge. An examination of the characteristic curves indicates several methods by which an A. C. amplifier may be used.

From the curve of ion current versus accelerator voltage, the linearity between 50 volts and 200 volts can be taken advantage of. This means that 50 volts D. C. is applied to the accelerator electrode and superimposed on this, another 150 volts of A. C. holding the rest of the parameters constant resulting in an A. C. ion current which is a function of the pressure.

In the curve of ion current versus electron current, it is noticed that a section of linearity between 5 ma. and 15 ma. can be utilized to give an A. C. ion current by varying the heater voltage with an A. C. cycle.

The frequency used in either case can be as high as when transit effects begin, but 60 cycles is preferred because of its convenience.

Another method of obtaining an alternating ion current for use in an A. C. amplifier is disclosed in my copending patent application, Method and Apparatus for Increasing the Sensitivity and Improving the Performance of Electronic Tubes, Serial No. 17,016, filed March 25, 1948, reference to which is hereby made. By using an alternating magnetic field exterior to the ionization gauge, it is possible to increase the sensitivity of the ionization gauge and at the same time provide an alternating ion current for amplification in the A. C. amplifier.

When using an A. C. amplifier it is preferred to employ either D. C. current or A. C. current which is 90° out of phase for heating the tube filaments in order to prevent leakage.

From the foregoing it will be seen that a superior ionization type pressure gauge for high vacuum work has been provided which not only is of higher accuracy than those heretofore provided, but which also produces an output current which is a linear function of the pressure being measured.

The gauge of this invention may be readily degassed by merely connecting the anode and the collector in series and passing a heating current therethrough. Furthermore, the gauge is normally operated so that the collector is constantly degassed during the time measurements are being taken, but may be operated with the collector cold if desired.

Various other changes and modifications in the described embodiments and their methods of operation such as will be apparent to those familiar with the art may be made without departing from the spirit of this invention whose scope is defined by the following claims.

What is claimed is:

1. An ionization gauge comprising an axial filament, a collector electrode surrounding said filament, said collector electrode being formed from a single length of high resistance wire, a center tap output lead extending to the mid-point of the wire, and an anode interposed between said filament and said collector.

2. An ionization gauge comprising an axial filament, a collector electrode surrounding said filament, said collector electrode being formed from a single length of high resistance wire, a center tap output lead extending to the mid-point of the wire, and an anode interposed between said filament and said collector, said anode being formed from a single length of wire wound in the form of a double helix, both ends being at the same end of said helix.

3. An ionization gauge comprising an axial filament, a helical anode surrounding said filament and spaced therefrom, and a helical collector electrode coaxial with said filament and spaced therefrom, said collector having an output lead connected at its mid-point.

4. An ionization gauge comprising an axial cathode, means for heating said cathode, a cylindrical anode surrounding said cathode, a cylindrical collector formed from a length of wire surrounding said anode and having an output lead connected at its mid-point, the ends of said wire being connected to a source of alternating heating current whereby said collector is heated during the time pressures are being measured.

5. An ionization gauge comprising an axial cathode, means for heating said cathode, a cylindrical anode charged to a high positive potential surrounding said cathode, a cylindrical collector charged negatively with respect to said cathode formed from a length of wire surrounding said anode and having an output lead connected at its mid-point, the ends of said wire being connected to a source of alternating heating current whereby said collector is heated during the time pressures are being measured, the spacing and potentials of said electrodes providing that the mean-free-path of ions formed between said anode and collector is less than 10 cm. in length when the gauge is subjected to a pressure $10^{-3}$ mm. of Hg.

6. An ionization gauge comprising an axial filament, a collector electrode surrounding said filament, said collector electrode being charged to a potential of from $-10$ to $-20$ volts D. C. and formed from a single length of high resistance wire, said collector having an output connected at its mid-point, and an anode interposed between said filament and said collector, said anode being charged to a potential whereby an anode current of from 0.0 to 18 milliamperes flows.

7. The method of determining the pressure within a space being evacuated which comprises heating a cathode within said space to cause electrons to be emitted, attracting said electrons to an anode proximate to said cathode said anode being charged to a high positive potential and the spacing and potentials applied to aforesaid electrodes being such that said electrons travel into the space beyond said anode and return thereto, attracting ions formed when some of said electrons strike gas atoms to a collector, continuously heating said collector to cause same to be outgassed, and measuring the current flowing from _id collector.

8. An ionization gauge including a collector electrode comprising a length of spirally wound resistance wire, said wire having an output lead connected at its mid-point, the ends of said wire being connected to a source of alternating current whereby said collector is heated for degassing purposes during the times pressures are being measured.

NICHOLAS D. GLYPTIS.

REFERENCES CITED

The following references are of record in the file of this patent:

UNITED STATES PATENTS

| Number | Name | Date |
|---|---|---|
| 1,289,823 | Langmuir | Dec. 31, 1918 |
| 1,645,904 | Gavin | Oct. 18, 1927 |
| 2,442,518 | Stratton | June 1, 1948 |
| 2,454,564 | Nelson | Nov. 23, 1948 |

OTHER REFERENCES

An Ionization Gauge Circuit by Bowie, Review of Scientific Instruments, August 1940, pages 265 to 267.